United States Patent
Kumar et al.

(10) Patent No.: US 8,664,422 B2
(45) Date of Patent: *Mar. 4, 2014

(54) SILICONE COMPOSITIONS AND METHODS FOR PREPARING THEM

(71) Applicant: Momentive Performance Materials Inc., Waterford, NY (US)

(72) Inventors: Vikram Kumar, Bangalore (IN); Mark D. Leatherman, Stamford, CT (US); Suresh Rajaraman, Macungie, PA (US); Anubhav Saxena, Bangalore (IN)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/933,461

(22) Filed: Jul. 2, 2013

(65) Prior Publication Data

US 2013/0296595 A1  Nov. 7, 2013

Related U.S. Application Data (60) Division of application No. 12/593,083, filed as application No. PCT/US2008/004025 on Mar. 27, 2008, now Pat. No. 8,524,934, which is a continuation of application No. 12/055,731, filed on Mar. 26, 2008, now abandoned.

(60) Provisional application No. 60/908,847, filed on Mar. 29, 2007.

(51) Int. Cl.
*C07F 7/18* (2006.01)

(52) U.S. Cl.
USPC .................................. 556/446; 556/444

(58) Field of Classification Search
USPC ........................................ 556/444, 446
See application file for complete search history.

(56) References Cited

U.S. PATENT DOCUMENTS

| | | | |
|---|---|---|---|
| 5,116,703 A | 5/1992 | Badesha et al. | |
| 6,492,481 B1 * | 12/2002 | Davis et al. | 528/29 |
| 7,888,447 B2 | 2/2011 | Dhara et al. | |
| 2004/0003473 A1 * | 1/2004 | Glenn et al. | 8/405 |
| 2007/0173598 A1 | 7/2007 | Williams et al. | |

FOREIGN PATENT DOCUMENTS

EP  1142933 A1  10/2001

* cited by examiner

*Primary Examiner* — Johann R Richter
*Assistant Examiner* — Pancham Bakshi
(74) *Attorney, Agent, or Firm* — Dominick G. Vicari; Joseph S. Ostroff (57) ABSTRACT

A silicone composition comprising a formula: $(M^1)_a(D^1)_b(D^2)_c$ wherein $M^1=R^1R^2R^3SiO_{1/2}$, $D^1=R^4R^5SiO_{2/2}$; and $D^2=R^6R^7SiO_{2/2}$; wherein $R^1$ is independently at each occurrence a monovalent hydrocarbon radical comprising a reactive end-group other than an amino group; $R^6$ comprises a monovalent poly(oxyalkyl)hydrocarbon radical; and $R^2$, $R^3$, $R^4$, $R^5$, and $R^7$ are independently monovalent hydrocarbon radicals; wherein a, b, and c are stoichiometric subscripts that are zero or positive subject to the following limitations: a is greater than or equal to 2; c is greater than or equal to 1; and when b=0, a+c is greater than or equal to 3 is disclosed.

15 Claims, 3 Drawing Sheets

SILICONE COMPOSITIONS AND METHODS FOR PREPARING THEM

CROSS REFERENCE TO RELATED APPLICATIONS

The present application claims priority to U.S. application Ser. No. 12/593,038 filed Apr. 2, 2010, which is a 35 U.S.C. §371 application of PCT/US08/04025 filed Mar. 27, 2008, which claims priority to U.S. application Ser. No 12/055,731 filed Mar. 26, 2008 and U.S. Provisional Application No. 60/908,847 filed Mar. 29, 2007, all of which are incorporated by reference herein.

BACKGROUND

The invention relates generally to organosilicone compositions comprising two reactive end-groups other than amino groups and one or more polyether pendant groups. Further, the invention relates to methods for selectively preparing these organosilicone compositions. Furthermore, the invention relates to hydrophilic polymer compositions comprising the organosilicone compositions as additives, and polymer and copolymer compositions comprising structural units derived from these organosilicone compositions. Further still, the invention relates to end-use formulations comprising the hydrophilic polymer compositions.

Siloxanes (also called organosilicones) are very useful for various applications, such as for example, as additives in polymer matrices. Organosilicones having pendant polyether groups and reactive amino end-groups that can react with an aldehyde functional group are known in the art. Further, organosilicones having pendant polyether groups are also known. However, there still remains a need for organosilicones comprising two reactive end-groups other than amino groups and one or more pendant polyether group(s) on the siloxane chain, which materials can potentially be valuable for forming more robust products for more demanding end-uses, such as those needing a desirable combination of properties such as surface activity, friction reduction, lubricity, impact strength, hydrophilicity, and oleophilicity. Further still, there remains a need for selective methods to prepare organosilicones comprising two reactive end-groups and one or more pendant polyether group(s) on the siloxane chain.

BRIEF DESCRIPTION

One aspect of the invention is a silicone composition comprising a formula: $(M^1)_a(D^1)_b(D^2)_c$ wherein $M^1=R^1R^2R^3SiO_{1/2}$; $D^1=R^4R^5SiO_{2/2}$; and $D^2=R^6R^7SiO_{2/2}$; wherein $R^1$ is independently at each occurrence a monovalent hydrocarbon radical comprising a reactive end-group other than an amino group; $R^6$ comprises a monovalent poly(oxyalkyl)hydrocarbon radical; and $R^2$, $R^3$, $R^4$, $R^5$, and $R^7$ are independently monovalent hydrocarbon radicals; wherein a, b, and c are stoichiometric subscripts that are zero or positive subject to the following limitations: a is greater than or equal to 2; c is greater than or equal to 1; and when b=0, a+c is greater than or equal to 3.

Another aspect of the invention is a silicone composition having a formula $(M^2)_h(D^3)_i(D^4)_j$ wherein $M^2=R^{22}(CH_3)_2SiO_{1/2}$; $D^3=(CH_3)_2SiO_{2/2}$; and $D^4=R^{23}R^{24}SiO_{2/2}$; wherein $R^{22}$ is a monovalent hydrocarbon radical comprising a reactive end-group other than an amino group; $R^{23}$ is a monovalent poly(oxyalkyl)hydrocarbon radical; and $R^{24}$ is a monovalent hydrocarbon radical; and wherein j has a value of 2; k has a value of 1 to 500; and l is greater than or equal to 1.

In yet another aspect, a method for preparing a silicone composition comprising a formula: $(M^1)_a(D^1)_b(D^2)_c$ is provided. The method comprises: (i) reacting a silicone having a formula $(M^1)_a(D^1)_p$ with a cyclic hydrosiloxane of formula $(D^5)_q$ to form an intermediate organosilicone hydride having a formula $(M^1)_a(D^1)_b(D^3)_c$; $M^1=R^1R^2R^3SiO_{1/2}$; $D^1=R^4R^5SiO_{2/2}$; and $D^3$ and $D^5$ are each $R^{30}HSiO_{1/2}$; wherein $R^1$ is independently at each occurrence a monovalent hydrocarbon radical comprising a reactive end-group other than an amino group; $R^2$, $R^3$, $R^4$, $R^5$, and $R^{30}$ are independently monovalent hydrocarbon radicals; and wherein a, b, c, p and q are stoichiometric subscripts that are zero or positive subject to the following limitations: q has a value of greater than or equal to 3; a=2; c is greater than or equal to 1; when p=0, a is 2; and when b+c=0, a+c is greater than or equal to 3; a is greater than or equal to 2; c is greater than or equal to 1; and when b=0, a+c is greater than or equal to 3; and (ii) reacting the intermediate organosilicone hydride with an unsaturated polyether to form a silicone composition having a formula: $(M)_a(D^1)_b(D^2)_c$; wherein $D^2=R^6R^7SiO_{2/2}$; wherein $R^6$ comprises a monovalent poly(oxyalkyl)hydrocarbon radical; and $R^7$ is a monovalent hydrocarbon radical; and wherein a, b, and c are stoichiometric subscripts that are zero or positive subject to the following limitations: a has a value of 2; c is greater than or equal to 1; and when b=0, a+c is greater than or equal to 3.

In other aspects, polymer compositions comprising the compositions (described above) as additives and a polymer, and formulations comprising the polymer compositions are provided.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

These and other features, aspects, and advantages of the present invention will become better understood in light of the following detailed description The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

The terms "radical" and "group", as applied to the terms "alkyl", "cycloalkyl", "aryl", "alkoxy", "aryloxy", and "cycloalkoxy" are used interchangeably throughout the disclosure.

Throughout the disclosure, the term "hydrocarbon radical" represents any of an aliphatic radical, a cycloaliphatic radical, or an aromatic radical having from one to sixty carbon atoms. The following general definitions for "aliphatic", "cycloaliphatic", and "aromatic" radicals are applicable for monovalent and divalent "hydrocarbon radicals".

As defined herein, the term "aliphatic" radical or group refers to an array of carbon atoms that is not cyclic, with the point(s) of attachment being an sp3 carbon atom. The array of carbon atoms may further comprise any combination of sp3, sp2, or sp hybridized carbon atoms. The array of carbon atoms may further comprise one or more heteroatoms, such as oxygen, nitrogen, and sulfur. Examples of aliphatic radicals include methyl, ethyl, n-propyl, isopropyl, n-butyl, tert-butyl, isooctyl, benzyl, cyclohexylmethyl, phenethyl, alpha,alpha-dimethylbenzyl, 3-hydroxypropyl, and the like.

As defined herein, the term "aromatic" radical or group refers to a monovalent cyclic array of $sp^2$ hybridized carbon atoms and conjugated carbon-carbon double bonds, and is attached via an $sp^2$ hybridized carbon atom. The aromatic group or radical can have from one to the maximum permissible number of substituents. Substituents are generally defined as radicals other than a hydrogen atom. Thus an aromatic carbon atom that is not explicitly substituted by a substituent is presumed substituted by a hydrogen atom. The aromatic radical or group can further comprise heteroatoms, such as sulfur, oxygen, and nitrogen. Examples of aryl groups include phenyl, substituted phenyl, tolyl, substituted tolyl, xylyl, mesityl, chlorophenyl, naphthyl, furyl, furylmethyl, thienyl, pyrrolyl, and the like.

As defined herein, the term "cycloaliphatic" radical or group refers to a monovalent cyclic array of carbon atoms, and is attached to the silicon atom via an $sp^3$ hybridized carbon atom that forms part of the cyclic array of carbon atoms. The cyclic array of carbon atoms may further comprise one or more heteroatoms, such as oxygen, sulfur, and nitrogen. Further, the cyclic array of carbon atoms can be substituted with one to the maximum permissible number of substituents. Examples of cycloalkyl groups include cyclohexyl, methylcyclohexyl, trimethylcyclohexyl, phenylcyclohexyl, tetrahydropyranyl, 4-thiacyclohexyl, cyclooctyl, and the like.

The term "alkoxy", "cycloalkoxy", or "aryloxy" refers to the monovalent radical resulting from bonding of the corresponding monovalent aliphatic radical, cycloaliphatic radical, or aromatic radical with an oxygen atom, respectively. The term "hydrocarbonyloxy" refers to the monovalent radical resulting from bonding of a monovalent hydrocarbon radical with an oxygen atom.

As defined herein, by the term "monovalent hydrocarbon radical comprising a reactive end-group" is meant any hydrocarbon radical defined as described above, but having a reactive end-group. Thus, unless otherwise specified, the term "monovalent hydrocarbon radical" excludes a "hydrocarbon radical comprising a reactive end-group".

As defined herein, the term "reactive end-group" denotes a functional group other than an amino group or a derivative thereof that is capable of reacting further to form polymers, oligomers, or other functional monomers. Some examples of reactive end-groups include hydroxy groups, carboxyl groups, and epoxy groups.

As defined herein, the term "monovalent poly(oxyalkyl) hydrocarbon radical" denotes a poly(oxyalkyl) chain capped with a hydroxyl or a hydrocarbonyloxy group at one end and with a monovalent hydrocarbon radical at the other end. So unless otherwise specified, the term "monovalent hydrocarbon radical" excludes "monovalent poly(oxyalkyl)hydrocarbon radical". The oxyalkyl component of the poly(oxyalkyl) hydrocarbon radical can have from 2 carbon atoms, that is oxyethyl group, to 20 carbon atoms. Some other examples of oxyalkyl groups include oxypropyl, oxybutyl, and the like.

Therefore, throughout the disclosure, the term "monovalent hydrocarbon radical" excludes a "hydrocarbon radical comprising a reactive end-group" and a "monovalent poly (oxyalkyl)hydrocarbon radical".

In one aspect, a silicone composition comprising a formula (I):

$$(M^1)_a(D^1)_b(D^2)_c \qquad (I)$$

is provided, wherein $M^1=R^1R^2R^3SiO_{1/2}$; $D=R^4R^5SiO_{2/2}$; and $D^2=R^6R^7SiO_{2/2}$; wherein $R^1$ is independently at each occurrence a monovalent hydrocarbon radical comprising a reactive end-group other than an amino group; $R^6$ comprises a monovalent poly(oxyalkyl)hydrocarbon radical; and $R^2$, $R^3$, $R^4$, $R^5$, and $R^7$ are independently monovalent hydrocarbon radicals; wherein a, b, and c are stoichiometric subscripts that are zero or positive subject to the following limitations: a is greater than or equal to 2; c is greater than or equal to 1; and when b=0, a+c is greater than or equal to 3.

In an embodiment, $R^2$, $R^3$, $R^4$, $R^5$, and $R^7$ in formula (I) are independently monovalent hydrocarbon radicals. Non-limiting examples of aliphatic radicals include methyl, ethyl, sec-butyl, tert-butyl, octyl, decyl, dodecyl, cetyl, hydroxypropyl, 2,5,8-trioxadecyl, triacontyl, and 3,3,3-trifluoropropyl. One or more of $R^2$, $R^3$, $R^4$, $R^5$, and $R^7$ may also be alkoxy radicals, such as for example, butoxy. In another embodiment, $R^2$, $R^3$, $R^4$, $R^5$, and $R^7$ are independently selected from the group consisting of aliphatic radicals and aromatic radicals. Some non-limiting examples include compositions where $R^4$ and/or $R^5$ are aromatic radicals, such as phenyl radicals; and $R^2$, $R^3$, and $R^7$ are independently alkyl radicals, such as for example, methyl, ethyl, and propyl.

By way of further examples, silicone compositions (I) are provided wherein a=2; b has a value of 2 to 200; and c has a value of 1 to 50; and wherein a=2; b has a value of 10 to 70; and c has a value of 1 to 15.

Structure (I) comprises at least one $R^6$ group, which is a monovalent poly(oxyalkyl)hydrocarbon radical having a formula (II):

$$-[R^8-O-(R^9-O)_d-OR^{10}] \qquad (II)$$

wherein $R^8$ and $R^9$ are independently divalent hydrocarbon radicals having 2 to 20 carbon atoms; $R^{10}$ is a hydrogen atom or a monovalent hydrocarbon radical having 1 to 20 carbon atoms; and d has a value from 1 to 100. In an embodiment, $R^9$ is selected from the group consisting of $-CH_2-CH_2-$, $-CH(CH_3)-CH_2-$, $-CH_2-CH(CH_2CH_3)-$, and $-CH_2-CH_2-CH_2-CH_2-$, or combinations thereof.

The terminus of the poly(oxyalkyl)hydrocarbon radical can in general be a hydroxy group or $OR^{10}$, where $R^{10}$ is a hydrogen atom or a monovalent hydrocarbon radical having 1 to 20 carbon atoms. Examples of $R^{10}$ include those selected from the group consisting of H, $CH_3$, $C_4H_9$, and $C_2H_5$; or combinations thereof.

The divalent hydrocarbon radical $R^8$ has a formula (III):

(Formula III)

wherein $R^{11}$, $R^{12}$, and $R^{13}$ are each independently a hydrogen atom or a monovalent hydrocarbon radical having 1 to 20 carbon atoms; W is a divalent hydrocarbon radical having from one to 60 carbon atoms; and e is greater than or equal to zero. Various structural possibilities can be envisaged for $R^8$. In an embodiment, W can be a methylene group, and in another embodiment, e can be zero. In still another embodiment, $R^8$ is an allyl group (wherein W is methylene, e is one, and $R^{11}$, $R^{12}$, and $R^{13}$ are each independently a hydrogen atom). In still yet another embodiment, when "W" is methylene, $R^{11}$ and $R^{12}$ are each a hydrogen atom, $R^{13}$ is a methyl, and e is one. The $R^6$ groups are structurally derived from the corresponding unsaturated polyethers, which are used for preparing the silicone compositions of formula (I) as discussed later below.

The silicone compositions represented by formula (I) comprises reactive end-group represented by $R^1$. Reactive end-groups other than amino groups can be used. Some examples of reactive-end groups include hydroxy group, carboxyl group, and epoxy group. Any combination of these groups can also be present. Further, the carboxyl group may be in the form of a carboxylic acid (COOH) group, or a carboxylic acid derivative, such as an ester or an amide. In another embodiment, the reactive end-groups are selected from the group consisting of hydroxyaromatic radicals, hydroxyaliphatic radicals, hydroxycycloaliphatic radicals, carboxyaromatic radicals, carboxyaliphatic radicals, carboxycycloaliphatic radicals, epoxyaromatic radicals, epoxyaliphatic radicals, and epoxycycloaliphatic radicals. More particularly, the reactive end-group $R^1$ independently at each occurrence comprises a hydroxyaromatic radical. In yet another embodiment, $R^1$ is represented by formula (IV)

(IV)

wherein $R^{14}$ is a hydrogen atom or a monovalent hydrocarbon radical having 1 to 20 carbon atoms. In yet another embodiment, $R^1$ is independently at each occurrence selected from the group consisting of formulas (V), (VI), and (VII).

(V)

(VI)

(VII)

The structures (V), (VI), and (VII) are derived from the phenols having formulas (VIII), (IX), and (X), (VIII)

(IX) and (X)

respectively, as discussed later.

In another embodiment, $R^1$ is independently at each occurrence comprises a general formula (XI), (XI)

wherein $Ar^1$ and $Ar^2$ are divalent aromatic radicals, $W^1$ and $W^2$ are each independently a divalent hydrocarbon radical having from one to sixty carbon atoms, $R^{15}$, $R^{16}$, and $R^{17}$ are each independently a hydrogen atom or a monovalent hydrocarbon radical having 1 to 20 carbon atoms, and $e^1$ and $e^2$ are each independently zero or greater. The divalent aromatic radicals $Ar^1$ and $Ar^2$ can be monocyclic, bicyclic or polycyclic, and further may independently comprise one or more substituents, such as aliphatic radicals, cycloaliphatic radicals, or aromatic radicals. The divalent hydrocarbon radicals $W^1$ and $W^2$ independently have from one to sixty carbon atoms. Further the hydrocarbon radicals may comprise halogen atoms, such as fluorine atoms. The divalent aromatic radicals $Ar^1$ and $Ar^2$ are generally those derived from dihydroxy aromatic compounds (also called bisphenols). In an embodiment, $R^1$ independently at each occurrence comprises a general formula (XI) wherein $Ar^1$ and $Ar^2$ are substituted or unsubstituted divalent phenylene radicals. In another embodiment, when $Ar^1$ and $Ar^2$ are substituted or unsubstituted divalent phenylene radicals, $W^1$ is a divalent hydrocarbon radical, such as for example and the like.

In still another embodiment, when $Ar^1$ and $Ar^2$ are substituted or unsubstituted divalent phenylene radicals, $W^1$ is $-C(CH_3)_2-$, $e^1$ and $e^2$ are each one, and $W^2$ is $CH_2$. In still yet another embodiment, when $Ar^1$ and $Ar^2$ are substituted or unsubstituted divalent phenylene radicals, $W^1$ is $-C(CH_3)_2-$, $e^1$ and $e^2$ are each one, $W^2$ is $CH_2$, and $R^{15}$, $R^{16}$, and $R^{17}$ are each a hydrogen atom. Further, when $Ar^1$ and $Ar^2$ are substituted or unsubstituted divalent phenylene radicals, $W^1$ is $-C(CH_3)_2-$, $e^1$ and $e^2$ are each one, $W^2$ is $CH_2$, $R^{15}$ is a methyl radical, and $R^{16}$ and $R^{17}$ are each a hydrogen atom. In a further structural variation, when $e^1$ in Formula (XI) is zero, structures comprising a biaryl radical will result.

In specific embodiments, $R^1$ is selected from the group consisting of Formulas (XII), (XIII) and (XIV), wherein $R^{18}$ is a hydrogen atom or a methyl radical, $R^{19}$ is a methyl or a trifluoromethyl radical, and $R^{20}$ is a hydrogen atom or a methyl radical. In an embodiment, the $R^{19}$ radicals taken together can form a cycloalkylidene (divalent) radical having from 3 to 12 carbon atoms.

In other embodiments, the silicone composition of formula (I) can further comprise $(T)_f$ units, wherein $T=R^{21}SiO_{3/2}$; wherein $R^{21}$ is a monovalent hydrocarbon radical; f is a stoichiometric subscript that is positive subject to the limitation that when b+f=0, a+c is greater than or equal to 3. In addition to $(T)_f$ units, the silicone composition may further comprise $(Q)_g$ units, wherein $Q=SiO_{4/2}$; g is a stoichiometric subscript that is positive subject to the limitation that when b+f+g=0, a+c is greater than or equal to 3.

In another aspect, a silicone composition having a formula (XV)

$$(M^2)_h(D^3)_i(D^4)_j \qquad (XV)$$

wherein $M^2=R^{22}(CH_3)_2SiO_{1/2}$; $D^3=(CH_3)_2SiO_{2/2}$; and $D^4=R^{23}R^{24}SiO_{2/2}$; wherein $R^{22}$ is a monovalent hydrocarbon radical comprising a reactive end-group other than an amino group; $R^{23}$ is a monovalent poly(oxyalkyl)hydrocarbon radical; and $R^{24}$ is a monovalent hydrocarbon radical; and wherein h has a value of 2; i has a value of 1 to 500; and j is greater than or equal to 1. In an embodiment, i has a value from 5 to 100; and j has a value from 1 to 50.

In an embodiment, in formula (XV), the substituent $R^{23}$ comprising a polyether fragment has a formula (XVI):

wherein $R^{25}$ is a hydrogen atom or a methyl radical; $R^{26}$ is a hydrogen atom or a monovalent hydrocarbon radical; m has a value from 1 to 20; n has a value from zero to 20; and o has a value from zero to 20. In another embodiment, $R^{25}$ is a methyl radical. Further, when $R^{25}$ is a methyl radical, i has a value from 5 to 100; and j is from 1 to about 50.

In an embodiment, $R^{22}$ in formula (XV) is selected from the group consisting of Formulas (V), (VI), (VII), and (XVII);

(XVII)

or combinations thereof; wherein $W^3$ is a divalent hydrocarbon radical having one to sixty carbon atoms, $e^3$ is zero or greater, and $R^{27}$ and $R^{28}$ are independently a hydrogen atom or a hydrocarbon radical, and $R^{29}$ is a hydrogen atom or a methyl radical. In a particular embodiment, $R^{22}$ has a formula (XVIII), (XVIII)

wherein $R^{29}$ is a hydrogen atom or a methyl radical. In another particular embodiment, $R^{22}$ has the formula (XVIII) wherein $R^{29}$ is a methyl radical. In still another embodiment, $R^{22}$ is selected from the group consisting of or combinations thereof; wherein $R^{29}$ is a methyl radical or a hydrogen atom. The silicone composition of formula (I) can be prepared by a general method as follows. First a silicone having a formula (XIX):

$$(M^1)_a(D^1)_p \quad (XIX)$$

is reacted with a cyclic hydrosiloxane of formula (XX)

$$(D^5)_q \quad (XX)$$

to form an intermediate organosilicone hydride having a formula (XXI):

$$(M^1)_a(D^1)_b(D^3)_c \quad (XXI)$$

wherein $M^1=R^1R^2R^3SiO_{1/2}$; $D^1=R^4R^5SiO_{2/2}$; and $D^3$ and $D^5$ are each $R^{30}HSiO_{1/2}$; wherein $R^1$ is independently at each occurrence a monovalent hydrocarbon radical comprising a reactive end-group other than an amino group; $R^2$, $R^3$, $R^4$, $R^5$, and $R^{30}$ are independently monovalent hydrocarbon radicals; and wherein a, b, c, p and q are stoichiometric subscripts that are zero or positive subject to the following limitations: q has a value of greater than or equal to 3; a is 2; c is greater than or equal to 1; when p=0, a is 2; and when b+c=0, a+c is greater than or equal to 3 a is greater than or equal to 2; c is greater than or equal to 1; and when b=0, a+c is greater than or equal to 3.

Various silicones having different reactive end-groups, such as hydroxy groups, carboxyl groups, and epoxy groups can be used in the first step. Silicones having aromatic hydroxy groups as the reactive end-groups, as described previously, are particularly useful. Some examples of useful silicones of formula (XIX) for the first step include compounds wherein $R^1$ has formulae (V), (VI), or (VII). Such compounds can be readily prepared by hydrosilylating the corresponding unsaturated hydroxyaromatic compound (VIII) (also called Eugenol), (IX), or (X) with a hydride-capped silicone resin, example a compound comprising a formula (XXII):

$$(M^3)_a(D^6)_j \quad (XXII)$$

wherein $M^3=HR^2R^3SiO_{1/2}$; and $D^6=R^{31}R^{32}SiO_{1/2}$; wherein $R^{31}$ and $R^{32}$ are monovalent hydrocarbon radicals; a and j are stoichiometric subscripts that are zero or positive subject to the following limitations: a+j=2; and j is greater than or equal to zero. The hydride-capped silicone resin (XXII) may further comprise "T" units or "Q" units defined as described previously. In some embodiments, suitable hydride-capped silicones (XXII) have an j value from 5 to 500, and from 5 to 100.

For preparing the starting material silicones of formula (XIX) wherein $R^1$ has the general formula (X), wherein $e^2$ is one or greater than one, the hydride-capped silicones of (XXII) are hydrosilylated with an mono-alkenyl ether of a dihydroxy aromatic compound, represented by a general formula (XXIII).

(XXIII)

wherein $Ar^1$, $Ar^2$, $W^1$, $W^2$, $R^{15}$, $R^{16}$, and $R^{17}$ are as described previously for formula (XI), $e^1$ is zero or greater than zero, and $e^2$ is one or greater than one. The compounds of formula (XXII) can be prepared by reacting a dihydroxy aromatic compound having formula (XXIV), $$HO—[Ar^1]—(W^1)_{e1}—[Ar^2]—OH \quad (XXIV)$$

wherein $Ar^1$, $Ar^2$, $W^1$, and $e^1$ are as described previously for formula (XXIII), with a compound having a general formula (XXV), (XXV)

wherein $W^2$, $e^2$, $R^{15}$, $R^{16}$, and $R^{17}$ are as previously described for formula (XXIV), and Y is a reactive leaving group. Selective formation of the mono-alkenyl ether can be accomplished by combining the compounds having formulas (XXIV) and (XXV) in the presence of a base in a biphasic reaction medium comprising water and an organic solvent that is immiscible or poorly miscible with water. A phase transfer catalyst may be used, however, satisfactory selectivity for mono-alkenylation can be generally achieved without the use of a phase transfer catalyst. Non-limiting examples of the base include alkali metal hydroxides, such as for example, sodium hydroxide, potassium hydroxide, and lithium hydroxide. Some examples of biphasic reaction media to prepare the mono-alkenyl ethers of formula (XXIII) include those comprising water and an organic solvent such as aliphatic hydrocarbons, aromatic hydrocarbons, cycloaliphatic hydrocarbons, aliphatic halides, aromatic halides, and cycloaliphatic halides. Some specific examples of organic solvents include dichloromethane, dichloropropane, dichlorobutane, chlorobenzene, dichlorobenzene, toluene, and xylene. In a particular embodiment, dichloromethane is used as the organic solvent in the biphasic medium since it gives the desired mono-alkenylated ethers of formula (XXII) in high selectivity. In an exemplary procedure, illustrated for the preparation of bisphenol A monoallyl ether, a mixture of 1 mole of bisphenol A, 3 moles of allyl chloride are combined in a biphasic medium comprising water, 2 moles of sodium hydroxide, and dichloromethane. The desired monoallyl ether of bisphenol A is then isolated by techniques commonly known in the art. The product can be characterized by proton nuclear magnetic resonance (NMR) spectroscopy and liquid chromatography-mass spectroscopy (LC-MS) techniques to verify and quantify the purity of the monoallyl ether of bisphenol A.

The general procedure described above can be repeated for any dihydroxy aromatic compound of Formula (XXIV). In an embodiment, dihydroxyaromatic compounds of Formula (XXVI), (XXVI)

wherein $R^{27}$, $R^{28}$, $W^3$, and $e^3$ are as described previously for formula (XVII) can be used for preparing a variety of mono-alkenylated ethers of formula (XXIII). Specifically, the technique can be used for preparing mono-allylated ethers of dihydroxy aromatic compounds of formula (XXVI), wherein $W^3$ is —C(CH$_3$)$_2$—, $e^3$ is one, and $R^{27}$ and $R^{28}$ are hydrogen atoms, as they are valuable raw materials for the hydrosilylation reaction with the hydride-capped silicone of formula (XXII)

Hydrosilylation reactions are generally carried out in the presence of a catalyst. The catalyst can be a free radical catalyst, such as an organic peroxide or an organic azo compound. Examples of peroxide catalysts include benzoyl peroxide, 2,5-dimethyl-2,5-di(tert-butylperoxy)hexane, and the like. The catalyst can also be an organometallic complex of a transition metal, such as platinum, which is generally used as a hydrosilylation catalyst. Rhodium catalysts may also be used. Usually, the platinum catalyst is introduced in a latent form such that the active form can be generated by application of an external stimulus, such as thermal energy or photo-chemical energy. For example, a platinum complex of 1-ethynyl-cyclohexan-1-ol can be used as the latent form of the catalyst. When the hydrosilylation reaction mixture is heated, the platinum complex releases 1-ethynyl-cyclohexan-1-ol, thereby releasing an active form of the platinum catalyst. Other catalysts known in the art, such as for example, sodium propionate can also be used. Mixtures of catalysts can also be used.

The redistribution reaction of the silicone of formula (XIX) with the cyclic hydrosiloxane of formula (XX) forms the intermediate organosilicone hydride having formula (XXI). Any cyclic hydrosiloxane wherein each silicon atom has one hydrocarbon radical and one hydrogen atom can be used. Non-limiting examples of cyclic hydrosiloxanes of formula (XIII) include tetramethyltetrahydrocyclotetrasiloxane; tetrabutyltetrahydrocyclotetrasiloxane, tetraphenyltetrahydrocyclotetrasiloxane, and trimethyltrihydrocyclotrisiloxane. A catalyst is generally used to facilitate this reaction. Alkali metal hydroxides, such as for example, cesium hydroxide can be used as a catalyst. In an embodiment, the redistribution reaction is helpful in forming compounds of formula (XXI) wherein b+c has a value from 5 to 100; and d has a value from 1 to 50.

Next, the organosilicone hydride of formula (XXII) is reacted with an unsaturated polyether to form the functionalized silicone composition having formula (I) (described previously). In an embodiment, the unsaturated polyether has a formula (XXVII)

(XXVII)

wherein $R^9$ is a divalent hydrocarbon radical having 2 to 20 carbon atoms; $R^{10}$, $R^{33}$, $R^{34}$, and $R^{35}$ are each independently a hydrogen atom or a monovalent hydrocarbon radical having 1 to 20 carbon atoms; d has a value from 1 to 100; e is greater than or equal to zero; and W is a divalent hydrocarbon radical having from one to 60 carbon atoms. A variety of polyethers having a terminal unsaturated group can also be used. Some examples of suitable unsaturated polyethers include allyl-terminated and vinyl terminated polyethers. Some unsaturated polyethers are also commercially available, such as for example, compounds represented by formula (XXVIII), (XXVIII)

wherein $R^{25}$ is a hydrogen atom or a methyl radical; $R^{26}$ is a hydrogen atom or a monovalent hydrocarbon radical; m has a value from 1 to 20; n has a value from zero to 20; and o has a value from zero to 20. In various embodiments, suitable unsaturated polyethers of formula (XXVIII) include those wherein m and o are zero, and n has a value from 1 to 20; n and o are zero, and m has a value of 1 to 20; and m and n are zero, and o has a value of 1 to 20. Some unsaturated polyethers are commercially available from Clariant Corporation and GE Silicones of General Electric Company.

In practice, when an allyl-terminated polyether of Formula (XXVIII) wherein $R^{25}$ is a hydrogen atom, and a platinum catalyst are used in the hydrosilylation step, the allyl group undergoes a rearrangement to the isomeric 1-propenyl form having a Formula (XXIX), as shown below.

The isomeric form (XXIX) subsequently undergoes a competing hydrosilylation reaction with the organosilicone hydride of formula (XXI). In order to prevent the competing reaction, an excess of the allyl-terminated polyether of Formula (XXVIII) over the organosilicone hydride of formula (XXI) is used. Generally, a 20 mole percent or higher excess of the allyl-terminated polyether over the organosilicone hydride is used. In an embodiment, a 30 mole percent excess of the allyl-terminated polyether over the organosilicone hydride is used.

The silicone compositions having general formulas (I) and (XV) are valuable as additives, or as monomers or comonomers for producing polymer compositions. As additives, the silicone compositions can be admixed with a polymer. Any polymer, such as a thermoplastic polymer or a thermoset polymer can be used as the matrix polymer. Non-limiting examples of polymers include polysiloxanes, polyacetals, polyacrylics, polycarbonates polystyrenes, polyesters, polyamides, polyarylates, polysulfones (including polyarylsulfones & polyethersulfones), polyphenylene sulfides, polyimides, polyetherimides, polytherketones, polyether etherketones, polyvinyl ethers, polyvinyl thioethers, polyvinyl alcohols, polyvinyl halides, polyvinyl nitriles, and polyvinyl esters. It is found that when a silicone resin of formula (I) is included with a polymer, such as a polycarbonate, the resulting polymer composition shows a significant reduction in the contact angle, which indicates that the polymer composition is significantly more hydrophilic than the starting polycarbonate.

As a monomer or a comonomer, the silicone compositions can be polymerized to give a variety of polymers. A given silicone monomer can be polymerized to the corresponding homopolymer. Two or more types of the silicones having reactive end-groups other than amino groups can also be co-polymerized. Further, a silicone monomer having a reactive end-group other than an amino group can be co-polymerized with a suitable non-silicone comonomer to give other types of copolymers. In an embodiment, since the reactive end-groups are selected from a hydroxyl group, a carboxyl group, and an epoxy group, a wide variety of homopolymers and copolymers can be prepared using techniques known in the art for polymerizing other known monomers having such reactive end-groups.

The polymer compositions are in turn valuable for producing various types of formulations suitable for different end-uses where a desirable combination of properties characteristic of a silicone resin and a polyether, such as surface activity, friction reduction, lubricity, impact strength, hydrophilicity, and oleophilicity is needed. Some end-uses include personal care formulations, such as for example, skin creams, shampoos, skin conditioners, and hair conditioners; home care formulations, such as for example, cleaners and polishes; textile treatment formulations, antifoam formulations, and surfactant formulations.

EXAMPLES

Contact angle was measured using a ramé-hart Goniometer, Model no. 100-00 and a drop having a volume of 2 microliters.

Proton NMR spectra were recorded using a Bruker 300 Megahertz spectrophotometer. Silicon-29 NMR spectra were recorded using a Bruker 400 Megahertz spectrophotometer.

Example 1

Preparation of Silicone Composition Having Formula (XXX)

wherein M=

; $D^1=(CH_3)_2Si—O_{2/2}$;

$D^2=$ x has a value from 5 to 500; y has a value from 1 to 500; and z has a value from 1 to 20. The starting material used for the equilibration with the cyclic hydrosiloxane was a eugenol-capped polydimethylsiloxane having formula (XXXI)

wherein M=

$D^1=(CH_3)_2Si-O_{2/2}$; and x has a value from 5 to 500.

Compound (XXXI) (CF2003 fluid, available from GE Silicones; 55 grams) and tetramethyltetrahydrocyclotetrasiloxane ($D_4^H$, 6.1 grams, purchased from Gelest, Incorporated) were mixed with sulfuric acid (0.3 gram) catalyst and stirred at room temperature. Immediately, the reaction mixture turned pink. Reaction progress was monitored by measuring the solids content of the reaction mixture. After being stirred at ambient temperature for 32 hours, the stirring was stopped. A pink mass settled at the bottom of the reaction mixture and was removed by decantation. The resulting reaction mixture was neutralized with sodium bicarbonate and then filtered to provide a pale yellow liquid which was stirred at 140° C. under vacuum to provide the desired eugenol-capped poly(dimethylsiloxane-co-methylhydrosiloxane) intermediate product. Repeated experiments following by $^{29}$Si NMR spectroscopic analysis indicated that the extent of incorporation of methylhydrosiloxane units in the product matched significantly well with the expected values based on the amount of tetramethyltetrahydrocyclotetrasiloxane taken (Table 1). Further, in each case the NMR analysis also indicated random incorporation of methylhydrosiloxane units in the polydimethylsiloxane chain.

TABLE 1

| Experiment number | Compound | | Number of H(CH$_3$)$_2$Si—O$_{2/2}$ units | |
|---|---|---|---|---|
| | (XXXI) (grams) | $D_4^H$ (grams) | Calculated | Measured ($^{29}$Si NMR) |
| 1 | 55 | 6.1 | 6.97 | 6.52 |
| 2 | 50.1 | 8 | 9.96 | 9.45 |
| 3 | 50.4 | 10 | 12.6 | 12.8 |

Figure 1:
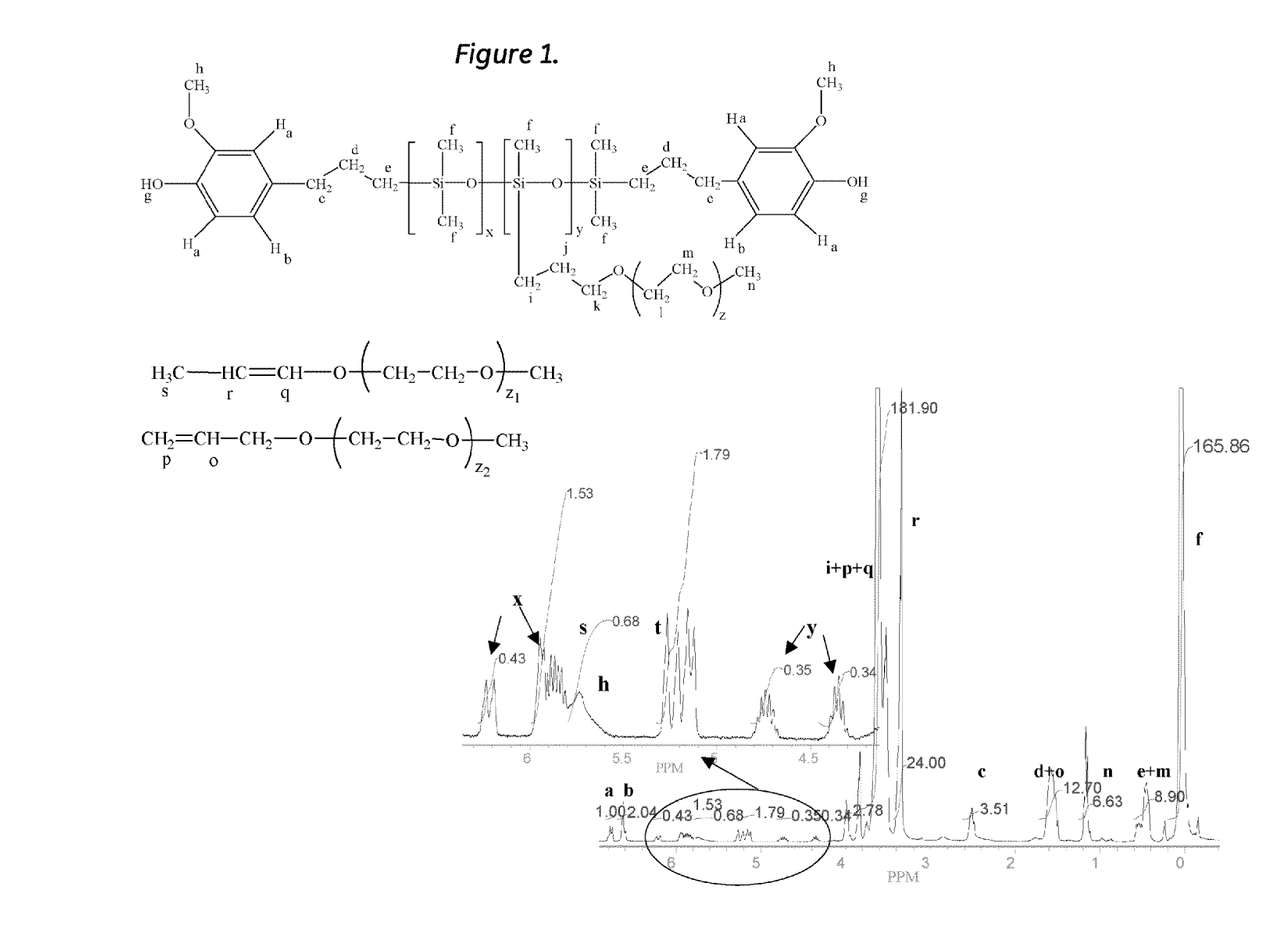
FIG. 1 represents proton nuclear magnetic resonance spectra with peak assignments for an exemplary silicone composition prepared using polyethylene glycol allyl ether in accordance with an embodiment of the invention, the figure further showing an inset spectrum of an expanded region comprising peaks having chemical shifts between about 4.2 parts per million and about 6.3 parts per million.
Figure 2:
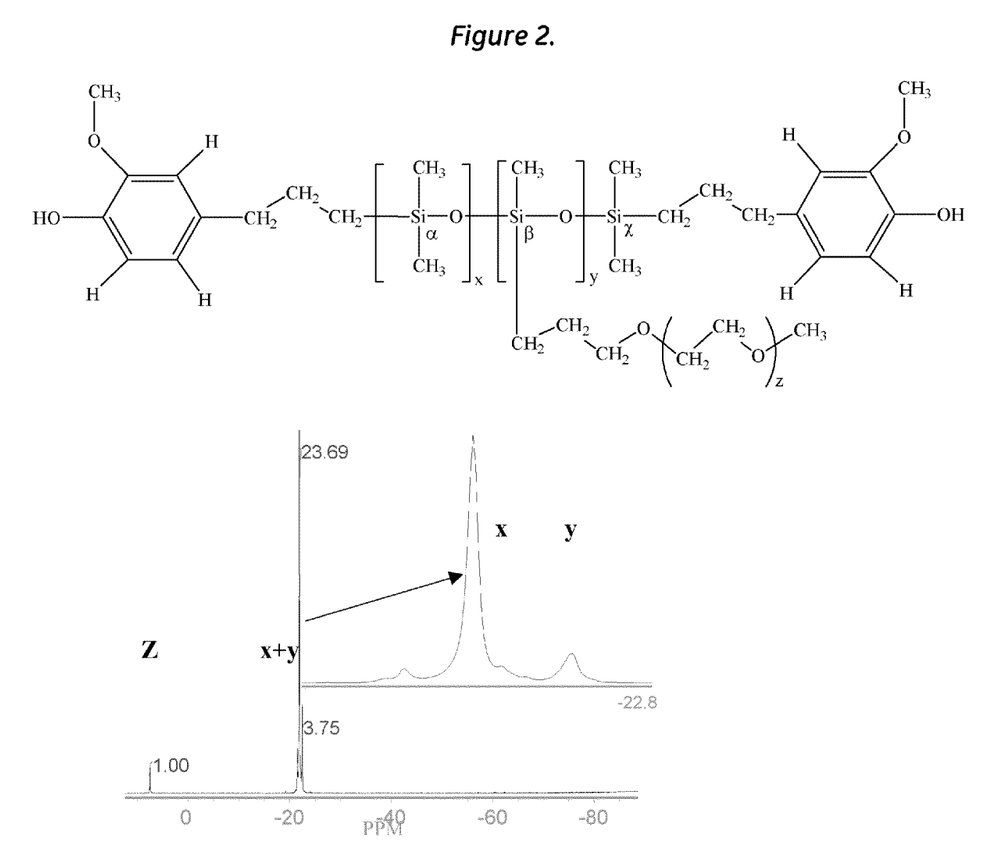
FIG. 2 represents a silicon-29 nuclear magnetic resonance spectrum of the silicone composition of FIG. 1.

Next, the eugenol-capped poly(dimethylsiloxane-co-methylhydrosiloxane) intermediate product (100 grams), polyethylene glycol allyl ether (molecular weight of approximately 350, 66 grams), Karstedt catalyst (equivalent to 10 ppm of platinum), and 30 milliliters of isopropanol were placed in a round-bottomed flask. The resulting mixture was stirred at 90° C. for 4 hours after which isopropanol was removed by distillation to furnish the compound of formula (XXIX) as a clear pale yellow fluid. Proton NMR and $^{29}$Si NMR spectra with peak assignments are shown in FIGS. 1 and 2, which show the formation of the desired product. Further, in FIG. 1, the proton NMR spectrum showed significant levels of vinyl proton resonances, which are characteristic of the rearranged form of the allyl ether form (see general formula XXIX), which is less reactive towards hydrosilylation than the allyl form (see general formula XXVII), thereby leading to an incomplete consumption of the organosilicone hydride.

Example 2

Preparation of Silicone Composition Having Formula (XXXII)

$$M_2(D^1)_x(D^2)_y \qquad (XXXII)$$

wherein M=

$D^1=(CH_3)_2Si-O_{2/2}$;
$D^2=$ $$(H_3C-\underset{\underset{O_{2/2}}{|}}{Si}-(CH_2)_3-O-(CH_2-CH_2-O)_{\overline{z}}-\underset{\underset{CH_3}{|}}{CH}-CH_2)-\underset{\underset{CH_3}{|}}{Si}-O_{1/2};$$

x has a value from 5 to 500; y has a value from 1 to 500; and z has a value from 1 to 20.

Figure 3:
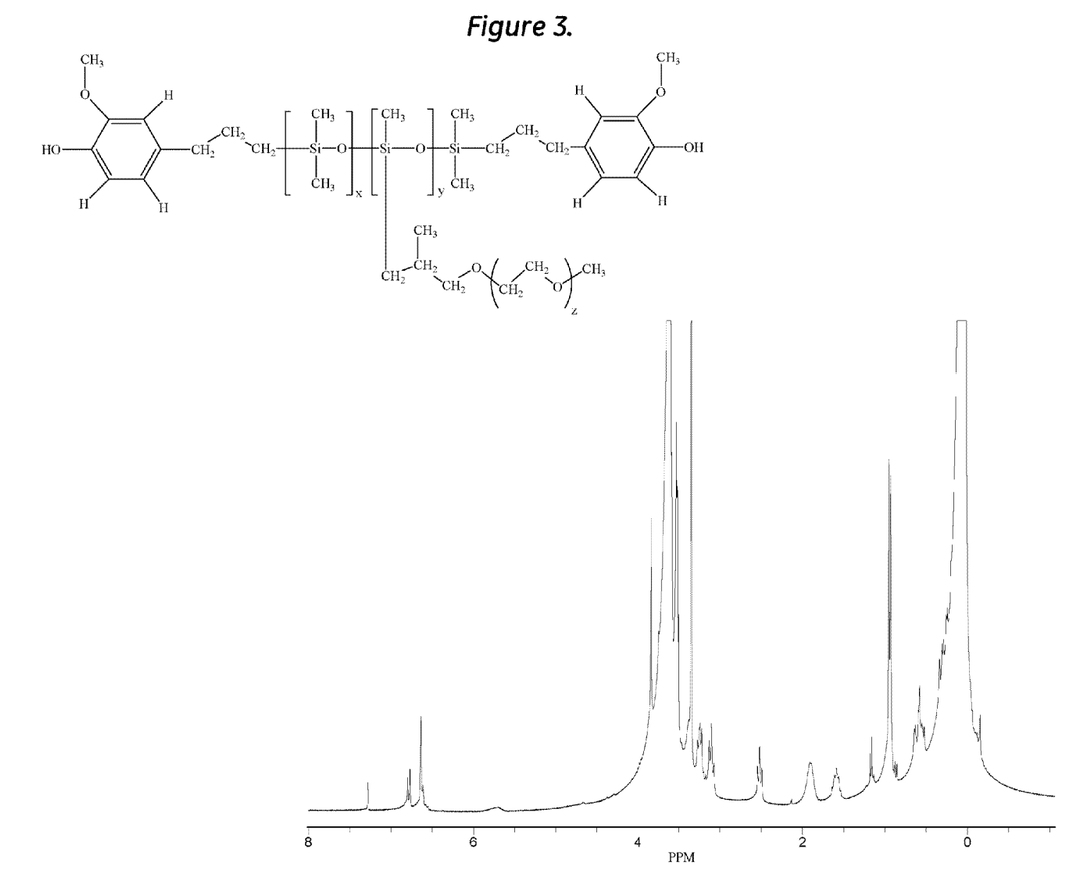
FIG. 3 represents a proton nuclear magnetic resonance spectrum of another exemplary silicone composition prepared using polyethylene glycol methallyl ether in accordance with another embodiment of the invention.

The procedure described for preparing the silicone composition of formula (XXX) was used, except that polyethylene glycol methallyl ether was used, and the reaction time was 12 hours. The silicone composition of formula (XXXII) was obtained as a pale yellow fluid. Proton NMR spectrum, shown in FIG. 3 shows the formation of the desired product. Further, FIG. 3 shows an absence of vinyl protons thus showing that the methallyl group does not undergo rearrangement, thereby leading to complete consumption of the organosilicone hydride.

Polymer compositions were prepared by including the silicone compositions of formula (XXX) into a BPA (bisphenol A) homopolycarbonate. Techniques used included static mixing or blending, spin casting as a film, and solvent casting as a film. Spin cast films were prepared from a chloroform solution containing the silicone composition of formula (XXX) and the matrix polymer. Solvent cast films were prepared by slow evaporation of a chloroform solution containing the dissolved silicone composition and the matrix polymer.

In each case, the contact angle made by the resulting blend or film was measured. The results are shown in Table 2. BPA PC refers to bisphenol A homopolycarbonate. The asterisk after the Example number in Table 2 indicates a Comparative Example. The test samples in Examples 3 to 5 and Comparative Example 1 were prepared by blending the components. The test samples in Example 6 and Comparative Example 2 were prepared by spin casting from a chloroform solution of the components.

TABLE 2

| Example number | Method of forming test sample | Additive (weight percent) in BPA PC | Contact Angle (degrees) |
|---|---|---|---|
| 3 | Blend | 1 | 45-48 |
| 4 | Blend | 3 | 25-30 |
| 5 | Blend | 20 | 15-24 |
| 6 | Spin cast film | 10 | 15-20 |
| 1* | Blend | 20 | 85-95 |
| 2* | Spin cast film | 10 | 90-92 |

*Indicates Comparative Example (already stated in the above paragraph)

The results in Table 2 show that including just 1 weight percent of the silicone composition of formula (XXX) comprising hydrophilic pendant polyether groups in a polycarbonate matrix reduces the contact angle to 45-48 degrees, relative to that observed for the sample of Comparative Example 1, which contained the eugenol-capped polydimethylsiloxane of formula (XXXI) having no hydrophilic polyether groups. Increasing the amount of the organosilicone composition in the polymer matrix further reduces the contact angle, thereby rendering the test sample even more hydrophilic. A similar behavior is seen with the spin cast films (see Example 6 and Comparative Example 2).

Example 7 provides an interfacial process for the preparation of a bisphenol A-PDMS-PEG copolymer To an 80 liter continuous stirred tank reactor (CSTR) equipped with an overhead condenser were charged a first lot of bisphenol A (2000 grams), methyl-tributylammonium chloride (20 grams, as a 70 percent weight by volume (w/v) solution in deionized water), methylene chloride (14 liters), deionized water (11.9 liters), para-cumyl phenol (10 grams), and sodium gluconate (10 grams). Phosgene (977 grams, at an addition rate of 80 grams per minute) was added to the resultant mixture. The pH of the mixture was adjusted and maintained between 6 to 8 during the addition of phosgene, using a 50 percent w/v solution of sodium hydroxide in deionized water. After the addition of phosgene was completed the pH of the resultant mixture was adjusted to 10 in the same manner as described above. The CSTR was then charged with PDMS-PEG diol (Formula I, 125 grams) and methylene chloride (0.5 liters). The pH of the resultant mixture was then raised to 11. After stirring the mixture for about 10 minutes a second lot of bisphenol A (500 grams), methylene chloride (5 liters), deionized water (7 liters), and para-cumyl phenol (80 grams) were charged to the CSTR. Phosgene (220 grams, at an addition rate of 80 grams per minute) was added to the resultant mixture. The pH of the mixture was maintained between 9 to 10 during the addition of phosgene in the same manner as described above. Triethylamine (30 milliliters) and methylene chloride (0.25 liters) were added to the CSTR. This addition was followed by the addition of phosgene (400 grams, at an addition rate of 80 grams per minute). The pH of the resultant mixture was adjusted and maintained between 9 to 10 during the addition of phosgene in the same manner as described above. The resultant mixture was then purged with nitrogen gas for about 5 to 10 minutes. The mixture was allowed to stand for about 5 to 30 minutes and the mixture separated into an aqueous layer and an organic layer. The organic layer was extracted and washed with dilute hydrochloric acid and deionized water using centrifugation The product was isolated by steam precipitation). The rheology and thermal stability of the product were tested and the results are provided in Table 7 below.

Example 8 provides an interfacial process for the preparation of a bisphenol A-PDMS-PEG copolymer via the formation of a bis-chloroformate.

To a 2 liter five necked round-bottomed flask were added a first lot of bisphenol A (25 grams), deionized water (200 milliliters), anhydrous methylene chloride HPLC grade (320 milliliters), para-cumyl phenol (1.40 grams), and methyl-tributylammonium chloride (0.3 milliliters). Phosgene (14 grams, at an addition rate of 2 grams per minute) was added to the resultant mixture. The pH of the mixture was maintained between 6 to 8 during the addition of phosgene, using a 50 percent w/v solution of sodium hydroxide in deionized water. After the addition of phosgene was completed the pH of the mixture was adjusted to 7 in the same manner as described above. A sample of the mixture was spotted on phosgene paper to ensure the presence of chloroformates. PDMS-PEG diol (formula XXX, 3 grams) was added and the pH of the resultant mixture was raised to 10 to 11 in the same manner as described above. After stirring the mixture for about 10 to 15 minutes at the pH of 10 to 11 a second lot of bisphenol A (25 grams) was added to the mixture followed by the addition of phosgene (14 grams, at an addition rate of 2 grams per minute). The pH of the mixture was adjusted to 9 to 10 in the same manner as described above. Triethylamine (0.46 grams) was added to the mixture, and the resultant mixture was stirred for about 30 minutes until a sample of the mixture when spotted on phosgene paper indicated the absence of chloroformates. The desired product was then isolated by washing with dilute hydrochloride acid, washing with deionized water three times, and precipitated into hot water.

Example 9 provides an interfacial process for the preparation of a bisphenol A-PDMS-PEG copolymer via the formation of a bis-chloroformate wherein at the end of the reaction the mixture was stirred at a higher pH for about 30 minutes.

The same procedure used in Example 8 was employed to prepare bisphenol A-PDMS-PEG copolymer except that 5 grams of PDMS-PEG diol (formula XXX) was used. Triethylamine (0.46 grams) was added to the mixture and the mixture stirred for about 30 minutes. Spotting a sample of the mixture on phosgene paper ensured the absence of chloroformates in the reaction mixture. The pH of the mixture was then increased to 11 to 13 and the mixture maintained at this pH for about 30 minutes. The desired product was then isolated in the same manner as described above in Example 7.

Example 10 provides a method for the preparation of a bisphenol A-PDMS-PEG copolymer in the presence of an activated carbonate.

To a stainless steel cylindrical polymerization reactor having a length of 30 centimeter, diameter of 13.3 centimeter, and a volume of 3 liters, were charged bisphenol A (806.3 grams), bismethylsalicylcarbonate (BMSC, 1200 grams), PDMS-PEG diol (formula XXX, 47.6 grams), sodium hydroxide ($2.13 \times 10^{-4}$ grams), and tetramethyl ammonium hydroxide (0.0323 grams). The reactor was subjected to a vacuum of 0 millibar and then subsequently purged with nitrogen. This process of subjecting the reactor to vacuum followed by purging with nitrogen gas was repeated three times. Finally the pressure inside the reactor was raised to atmospheric pressure by nitrogen. The reactor was then heated to 180° C. in a period of about 15 minutes to provide a molten mixture of the contents. After holding at 180° C. and atmospheric pressure for about 20 minutes the stirrer was switched on. After stirring the mixture at 180° C. for 15 minutes. The temperature was increased to 220° C. under atmospheric pressure in a period of about 5 minutes. After holding at 220° C. and atmospheric pressure for about 25 minutes the temperature was increased to 230° C. in about 5 minutes and the pressure was reduced to 100 millibar in about 10 minutes. After holding at 230° C. and 100 millibar for about 15 minutes the temperature of the reactor was raised to 275° C. in about 5 minutes and the pressure was reduced to 0 millibar in about 5 minutes. After holding at 275° C. and 0 millibar for about 10 minutes the pressure inside the reactor was raised to atmospheric pressure and the desired copolymer was isolated in a yield of about 800 grams.

Example 11 provides a method for the preparation of a bisphenol A-PDMS-PEG in the presence of an activated carbonate.

The same procedure as used in Example 10 was followed except that bisphenol A (809.2 grams), and PDMS-PEG diol (formula XXX, 18.4 grams) were used. The reactor was then heated to 180° C. under atmospheric pressure. After holding at 180° C. and atmospheric pressure for about 25 minutes the temperature was increased to 220° C. under atmospheric pressure in a period of about 5 minutes. After holding at 220° C. and atmospheric pressure for about 30 minutes the temperature was increased to 230° C. in about 5 minutes and the pressure was reduced to 100 millibar in about 10 minutes.

After holding at 230° C. and 100 millibar for about 25 minutes the temperature of the reactor was raised to 275° C. in about 5 minutes and the pressure was reduced to 0 millibar in about 5 minutes. After holding at 275° C. and 0 millibar for about 15 minutes the pressure inside the reactor was raised to atmospheric pressure and the desired copolymer was isolated in a yield of about 800 grams.

Example 12 provides a melt method for the preparation of a bisphenol A-PDMS-PEG copolymer in the presence of an activated carbonate.

The same procedure as used in Example 4 was followed except in that PDMS-PEG diol (formula XXX, 102.3 grams) was used. The reactor was then heated to 180° C. under atmospheric pressure. After holding at 180° C. and atmospheric pressure for about 55 minutes the temperature was increased to 220° C. under atmospheric pressure in a period of about 5 minutes. After holding at 220° C. and atmospheric pressure for about 30 minutes the temperature was increased to 230° C. in about 5 minutes and the pressure was reduced to 100 millibar in about 10 minutes. After holding at 230° C. and 100 millibar for about 20 minutes the temperature of the reactor was raised to 275° C. in about 5 minutes and the pressure was reduced to 0 millibar in about 5 minutes. After holding at 275° C. and 0 millibar for about 30 minutes the pressure inside the reactor was raised to atmospheric pressure and the desired copolymer was isolated in a yield of about 800 grams.

The general procedures used for molding the PDMS-PEG-Bisphenol A copolymer prepared in Examples 7, 8 and 9 are given below. The copolymer powder was compounded in a Wayne Machine and Die Co. single screw extruder with 0.75 inch diameter screw and a length/diameter ratio (L/D) equal to 38. The conditions used for compounding are given below in Table 3.

TABLE 3

| Process Parameter | Value |
| --- | --- |
| Temperature Zone 1 | 240° C. |
| Temperature Zone 2 | 250° C. |
| Temperature Zone 3 | 250° C. |
| Temperature of Die | 255° C. |
| Vacuum Applied | No |
| Screw Speed | 100 RPM |
| Current/Torque | 10 to 20 amperes |

The general procedure used for producing molded chips from the extruded pellets prepared as described above is as follows. The extruded pellets were dried in an oven maintained at 110° C. for about 4 hours. Then the dried pellets were subjected to molding using a LTM-Demag molding machine (60T) to provide petry dishes. The conditions for preparing the petry dishes are shown in Table 4.

TABLE 4

| Process Parameters | Value |
| --- | --- |
| Feed zone temperature (° C.) | 110 |
| Zone 1 temperature (° C.) | 260 |
| Zone 2 temperature (° C.) | 270 |
| Zone 3 temperature (° C.) | 275 |
| Nozzle Temperature (° C.) | 280 |
| Mold temperature (° C.) | 80 |
| Sample drying time (hours) | 4 |

TABLE 4-continued

| Process Parameters | Value |
| --- | --- |
| Sample drying temperature | 110 |
| Cycle time (seconds) | 30 |
| Injection time (seconds) | 1.2 |
| Injection speed (revolutions | 25 |
| Injection pressure (bar) | 50 |
| Screw speed (Revolutions per | 300 |
| Holding pressure (bar) | 40 |
| Holding time (seconds) | 10 |
| Cooling time (seconds) | 15 |

The general procedure for molding the copolymers prepared in Examples 10 and 11 is as given below. The copolymer was collected in the form of strands from the reactor. The strands were then pelletized and injection molded in the form of petry dishes using the conditions mentioned in Table 4 above.

The general procedure for molding the copolymer prepared in Example 12 is as given below. Bisphenol A-PDMS-PEG copolymer was collected in the form of strands from the reactor. A mixture of bisphenol A-PDMS-PEG copolymer (200 grams; molecular weight (Mw) 48553-measured using polystyrene standards and having a Tg of 131° C.) was then compounded with bisphenol A (molecular weight about 60,000 measured using polystyrene standards; 557.6 grams), (molecular weight about 40,000 measured using polystyrene standards; 242.4 grams) and Irgafos 168 (0.6 grams) was extruded using a Werner and Pfleiderer™ Twin Screw Extruder, Model ZSK-25 Mega Compounder using the condition given in Table 5 below. The abbreviation "rpm" stands for rotations per minute. The extruded strands were then pelletized and injection molded in the form of petry dishes using the conditions mentioned in Table 4 above.

TABLE 5

| Process Parameter | Value |
| --- | --- |
| Temperature Feeding Zone | 93° C. |
| Temperature Zone 1 | 121° C. |
| Temperature Zone 2 | 260° C. |
| Temperature Zone 3 | 271° C. |
| Temperature Zone 4 | 282° C. |
| Temperature of Throat/Die | 289° C. |
| Vacuum Applied | Yes |
| Screw Speed | 400 rpm |
| Temperature of Melt | 321° C. |
| Current/Torque | about 80 amperes |

The samples so formed were tested for molecular weight, Tg, transparency and amount of PDMS-PEG diol (formula XXX) in the copolymer used for making the pellets.

TABLE 6

| Example | Molecular weight (Polycarbonate standards) | PDI | Tg ° C. | Td ° C. | PDMS-PEG diol (weight percent) in the copolymer | Transmission in percentage |
|---|---|---|---|---|---|---|
| 1 | 50300 | 6.2 | 149 | 432 | 4.6 | 85.4 |
| 2 | 23200 | 3.5 | 140 | 377 | 8.8 | NA |
| 3 | 17300 | 2.3 | 146 | 213 | 8.8 | NA |

Amount of PDMS-PEG diol in the copolymer (weight percent) is based on the total amount of BPA, PCP, and PDMS-PEG diol.
Td ° C. (decomposition onset temperature)
Transmission percentage was measured on a 3.2 millimeter thick disk The results in Table 6 provide the molecular weight and thermal characteristics of Examples 7 to 9. As can be seen from the Table 3, the glass transition temperature (Tg) of the copolymer was between 140 to 150° C. Also, the thermal decomposition temperature measured by thermal gravimetric analysis (TGA) was found to be similar to standard copolymer at the higher molecular weights; however Example 9 appeared to degrade faster because of its lower molecular weight or possibly due to some degradation due to higher pH conditions at the end of polymerization.

TABLE 7

Rheology and thermal stability data for copolymer of Example 7

| Example | $MVR^a$ 250° C. (cc/10 min) | $MVRd^b$ 250° C. (cc/10 min) | $MVR^a$ 300° C. (cc/10 min) | $MVRd^b$ 300° C. (cc/10 min) | TSV loss at 250° C./30 min | TSV loss at 300° C./30 min |
|---|---|---|---|---|---|---|
| 7 | 0.77 | 0.69 | 5.63 | 8.23 | 18 | 58 |

The results provided in Table 7 indicate that the copolymer has better thermal stability at 250° C. than at 300° C. since a loss in viscosity is observed at 300° C. Melt volume rate ($MVR^a$) was measured at 6 minutes and the Melt volume rate delayed ($MVRd^b$) was measured at 18 minutes. Time sweep viscosity (TSV) was measured at 30 minutes and 1 radian per second frequency at constant temperatures as indicated in the Table 7.

TABLE 8

| Example | Molecular weight (Polystyrene standards) | Tg in (° C.) | Amount of PEG-Eugenol siloxane compound in the copolymer/formulation (weight percent) | Transparency in percentage | Injection Molding Temperature in ° C. |
|---|---|---|---|---|---|
| 10 | 66151 | 147 | 5.6 | Opaque | 280 |
| 11 | 46694 | 140 | 2.2 | Opaque | 270 |
| 12 | blend with BPA polycarbonate hence Mwt not included | blend with BPA polycarbonate hence Tg not included | 2.0 | Opaque | 280 |

The results provided in Table 8 indicate that when the bisphenol A-PDMS-PEG copolymer is prepared using activated bicarbonate the resultant polymers are opaque.

The procedure for measuring platelet retention was carried out in two steps as indicated below:
 1. Exposure of blood to the test materials, and
 2. Measurement of platelet count.
The copolymers molded in the form of petry dishes (hereinafter referred to as test materials) prepared in Examples 7, 10, 11 and 12 were tested to measure platelet retention. Blood from human volunteers was collected into an anticoagulant, citrate phosphate dextrose in commercially available blood collecting pouches. The test materials were placed in airtight plastic containers and measures were taken to control the humidity inside the container. To each test material was added 5 milliliters of collected blood sample. 1 milliliters of the blood sample was withdrawn from the flask immediately for platelet count. The remaining 4 milliliters of the blood was retained in the flask and kept in contact with the test material for about 75 minutes under stirring at a speed of about 70 to 80 rotations per minute (rpm) using an Environ shaker at a temperature of about 33° C. to about 37° C. Each test material and the bisphenol A homopolycarbonate (each time a test material was tested a blank sample of bisphenol A homopolycarbonate was also tested to ensure same testing conditions for the bisphenol A-PDMS-PEG copolymer and the bisphenol A homopolycarbonate) were tested 5 to 6 times with the same blood sample. The platelet retention was analyzed by determining the platelet counts in the initial sample and the sample after 75 minutes exposure to the test material, using a Hematology Analyzer (COBAS MINOS VET®, Roche Diagnostics France). The equipment was calibrated using a traceable standard reference control from Bio-Rad, USA. The results were compared with the platelet counts for bisphenol A homopolycarbonate (BPA PC) wherein the tests were conducted under the same conditions. The results of the analysis are provided in Table 9, 10, and 11 below.

TABLE 9

| Sample | Initial total Count in 4.0 milliliters blood (×10$^8$) | Final total Count in 4.0 milliliters blood (×10$^8$) | Platelet retention (%) | Average percentage retention | Standard deviation |
|---|---|---|---|---|---|
| Example 7 | 12.4 | 8.52 | 68.7 | 77.6 | 6.9 |
|  | 13.4 | 10.96 | 81.8 |  |  |
|  | 11.56 | 9.2 | 79.6 |  |  |

TABLE 9-continued

| Sample | Initial total Count in 4.0 milliliters blood (×10⁸) | Final total Count in 4.0 milliliters blood (×10⁸) | Platelet retention (%) | Average percentage retention | Standard deviation |
|---|---|---|---|---|---|
| | 12.28 | 8.88 | 72.3 | | |
| | 12.4 | 9.36 | 75.5 | | |
| | 12.2 | 10.72 | 87.9 | | |
| BPA PC | 12.48 | 8.16 | 65.4 | 65.9 | 5.3 |
| | 12.6 | 9 | 71.4 | | |
| | 11.48 | 7.72 | 67.2 | | |
| | 11.4 | 8.12 | 71.2 | | |
| | 12.4 | 7.72 | 62.3 | | |
| | 13.2 | 7.64 | 57.9 | | |

TABLE 10

| Sample | Initial total Count in 4.0 milliliters blood (×10⁸) | Final total Count in 4.0 milliliters blood (×10⁸) | Percentage retention (%) | Average percentage retention | Standard deviation |
|---|---|---|---|---|---|
| Example 10 | 6.32 | 5.64 | 89.2 | 88.0 | 7.4 |
| | 6.36 | 6.20 | 97.5 | | |
| | 6.56 | 5.72 | 87.2 | | |
| | 6.40 | 5.32 | 83.1 | | |
| | 8.04 | 7.56 | 94.0 | | |
| | 6.24 | 4.80 | 76.9 | | |
| Example 11 | 7.20 | 6.08 | 84.4 | 85.3 | 5.8 |
| | 6.48 | 6.20 | 95.7 | | |
| | 7.56 | 6.52 | 86.2 | | |
| | 7.28 | 6.24 | 85.7 | | |
| | 7.36 | 5.96 | 81.0 | | |
| | 7.60 | 6.00 | 78.9 | | |
| BPA PC | 8.20 | 4.92 | 60.0 | 60.6 | 3.5 |
| | 8.36 | 5.56 | 66.5 | | |
| | 8.48 | 5.16 | 60.8 | | |
| | 8.44 | 4.80 | 56.9 | | |
| | 8.84 | 5.08 | 57.5 | | |
| | 8.36 | 5.16 | 61.7 | | |

TABLE 11

| Sample | Initial total Count in 4.0 milliliters blood (×10⁸) | Final total Count in 4.0 milliliters blood (×10⁸) | Percentage retention (%) | Average percentage retention | Standard deviation |
|---|---|---|---|---|---|
| Example 12 | 8.76 | 7.2 | 82.2 | 90.0 | 9.6 |
| | 9.32 | 8.6 | 92.3 | | |
| | 8.12 | 8.48 | 104.4 | | |
| | 9.08 | 8.24 | 90.7 | | |
| | 9.64 | 7.76 | 80.5 | | |
| BPA PC | 9.48 | 7.8 | 82.3 | 75.1 | 4.2 |
| | 9.56 | 7.12 | 74.5 | | |
| | 9.4 | 6.68 | 71.1 | | |
| | 9.08 | 6.68 | 73.6 | | |
| | 9 | 6.68 | 74.2 | | |

The averages and standard deviations are calculated as usual. 'Two sample t test' was performed to show that platelet retention numbers for the examples are statistically higher than BPA-PC, hence they have better hemocompatibility. A p-value of <0.05 proved the statistically significant difference.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method to form a silicone composition having a formula: $(M^1)_a(D^1)_b(D^2)_c$, comprising:
reacting a silicone having a formula $(M^1)_a(D^1)_p$ with a cyclic hydrosiloxane of formula $(D^5)_q$ to form an intermediate organosilicone hydride having a formula $(M)_a(D^1)_b(D^3)_c$, wherein $M^1=R^1R^2R^3SiO_{1/2}$; $D^1=R^4R^5SiO_{2/2}$; and $D^3$ and $D^5$ are each $R^{30}HSiO_{1/2}$; wherein $R^1$ is independently at each occurrence a monovalent hydrocarbon radical comprising a reactive end-group other than an amino group; $R^2$, $R^3$, $R^4$, $R^5$, and $R^{30}$ are independently monovalent hydrocarbon radicals; and wherein a, b, c, p and q are stoichiometric subscripts that are zero or positive subject to the following limitations: q has a value of greater than or equal to 3; a=2; c is greater than or equal to 1; and
reacting the intermediate organosilicone hydride with an unsaturated polyether to form the silicone composition of formula: $(M^1)_a(D^1)_b(D^2)_c$ wherein $D^2=R^6R^7SiO_{2/2}$; wherein $R^6$ comprises a monovalent poly(oxyalkyl) hydrocarbon radical; and $R^7$ is a monovalent hydrocarbon radical; and wherein a, b, and c are stoichiometric subscripts that are zero or positive subject to the following limitations: a has a value of 2; and c is greater than or equal to 1 wherein the reactive end-groups are selected from the group consisting of hydroxyaromatic radicals, hydroxycycloaliphatic radicals, carboxyaromatic radicals, carboxyaliphatic radicals, carboxycycloaliphatic radicals, epoxyaromatic radicals, epoxyaliphatic radicals, and epoxycycloaliphatic radicals.

2. The method of claim 1, wherein the unsaturated polyether has a formula wherein $R^9$ is a divalent hydrocarbon radical having 2 to 20 carbon atoms; $R^{10}$, $R^{33}$, $R^{34}$, and $R^{35}$ are each independently a hydrogen atom or a monovalent hydrocarbon radical having 1 to 20 carbon atoms; d has a value from 1 to 100; e is greater than or equal to zero; and W is a divalent hydrocarbon radical having from one to 60 carbon atoms.

3. The method of claim 2, wherein $R^{33}$ is selected from the group consisting of H and $CH_3$; or mixtures thereof.

4. The method of claim 2, wherein $R^{33}$ is $CH_3$.

5. The method of claim 4, wherein the unsaturated polyether is taken in an amount that is greater than or equal to about 20 mole percent excess relative to the amount of the intermediate organosilicone hydride.

6. The method of claim 2, wherein the cyclic hydrosiloxane is cyclotetramethyltetrahydrosiloxane.

7. The method of claim 1, wherein the unsaturated polyether has a formula wherein $R^{25}$ is hydrogen or methyl, $R^{26}$ is a hydrogen or monovalent hydrocarbon radical, m is 1 to 20; n is or to 20, and o is from zero to 20.

8. The method of claim 7, wherein $R^{25}$ is hydrogen.

9. A silicone composition prepared from the method of claim 1.

10. A silicone composition prepared from the method of claim 2.

11. A silicone composition prepared from the method of claim 3.

12. A silicone composition prepared from the method of claim 4.

13. A silicone composition prepared from the method of claim 5.

14. A silicone composition prepared from the method of claim 6.

15. A silicone composition prepared from the method of claim 7.

* * * * *